No. 651,141.  
J. R. JONES.  
TONGUE PROP FOR SELF BINDERS.  
(Application filed Jan. 21, 1899.)  
(No Model.)  
Patented June 5, 1900.
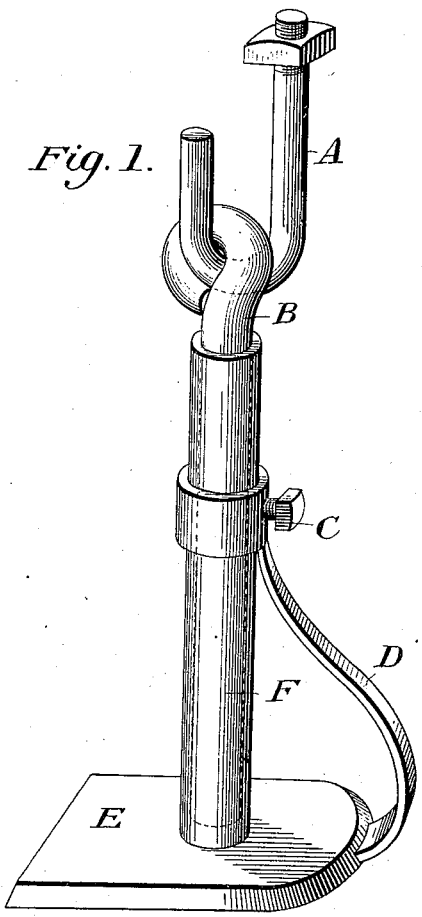
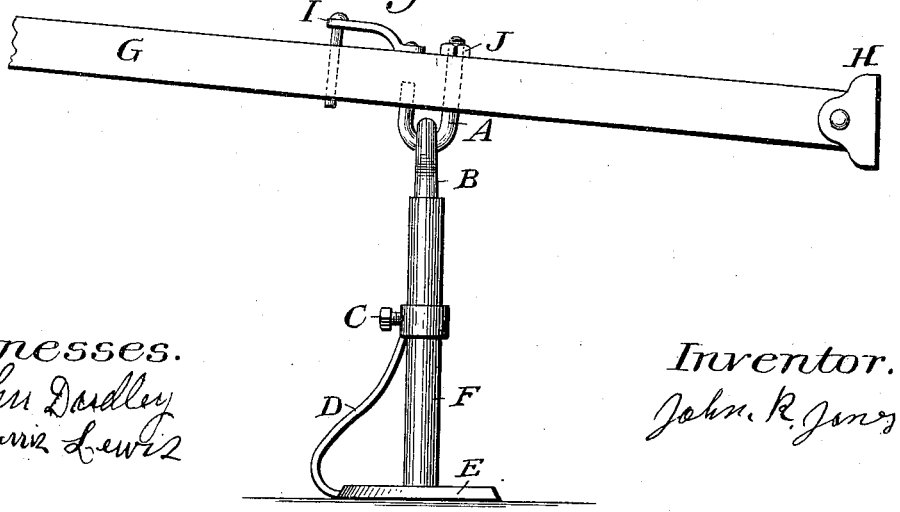
Witnesses.
John Dudley
Morris Lewis
Inventor.
John R. Jones

UNITED STATES PATENT OFFICE.

JOHN RILEY JONES, OF RUSKIN, NEBRASKA.

TONGUE-PROP FOR SELF-BINDERS.

SPECIFICATION forming part of Letters Patent No. 651,141, dated June 5, 1900.

Application filed January 21, 1899. Serial No. 703,008. (No model.)

*To all whom it may concern:*

Be it known that I, JOHN RILEY JONES, a citizen of the United States, residing at Ruskin, in the county of Nuckolls and State of Nebraska, have invented certain new and useful Improvements in Tongue-Props for Self-Binders and other Machines, of which the following, taken in connection with the accompanying drawings, is a specification.
This invention relates to improvements in supports for the tongues of self-binders or other machines, and has for its object to provide a simple and efficient device of this character adapted to rest upon the ground and sustain the tongue and frame of the machine when the latter is at rest, and thereby relieve the draft-animals of the weight thereof.

In the accompanying drawings, forming a part of this specification, Figure 1 is a perspective view of the device; and Fig. 2 is a side elevation thereof, showing the same connected to the tongue of a self-binder or other machine.

E represents a footpiece having a long socket F rising from the upper surface thereof.

D is a brace secured to one side of the footpiece and extending upward and terminating in or secured to a ring which embraces or surrounds the socket F. Through this ring is tapped a set-screw C. To the socket F is fitted a stem B, having an eye in its upper end.

G is the tongue, secured to the frame of the machine at H. Through the tongue G is placed the hook A, which takes into the eye of stem B and is secured in place by the nut J. The stem can be adjusted in the socket F by means of the set-screw C to any height desired.

It will thus be seen that I have produced a simple and effective tongue-support which may be used to relieve the animals from the weight of the machine when at rest.

What I claim, and desire to secure by Letters Patent, is—

A tongue-prop for self-binders consisting of the footpiece E, brace D, socket F, adjustable stem B and hook A, combined and operating substantially as described.

JOHN RILEY JONES.

Witnesses:
R. H. HUTCHINSON,
WILLIAM W. WINSLOW.